Dec. 9, 1947.  H. H. RANNEY  2,432,443
RELEASING TAP AND DIE HOLDER
Filed Oct. 16, 1945
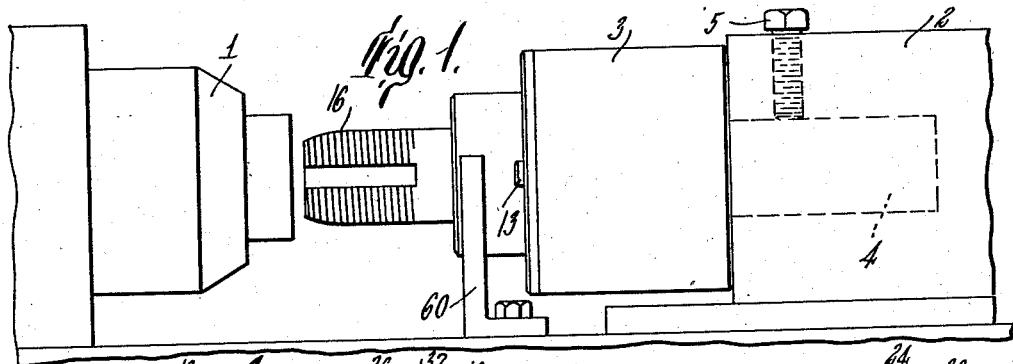
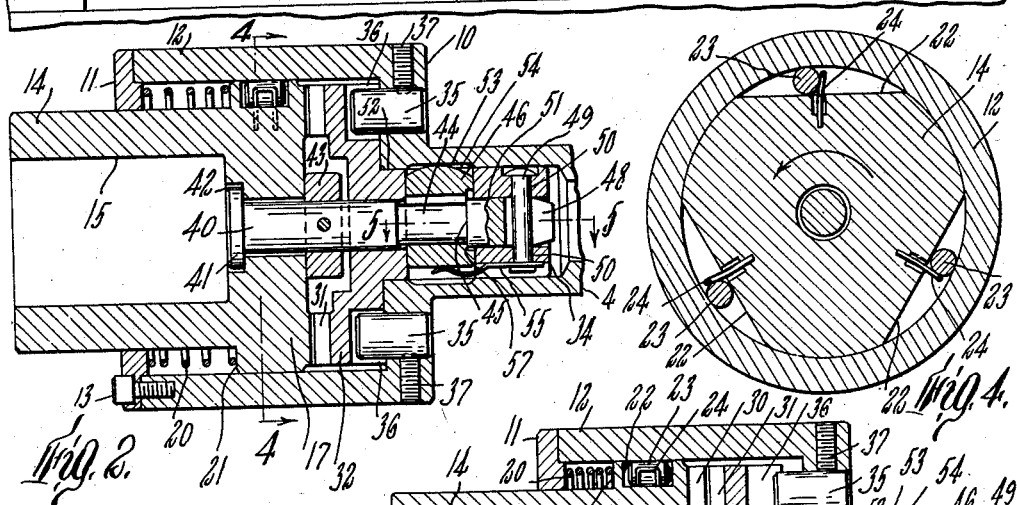
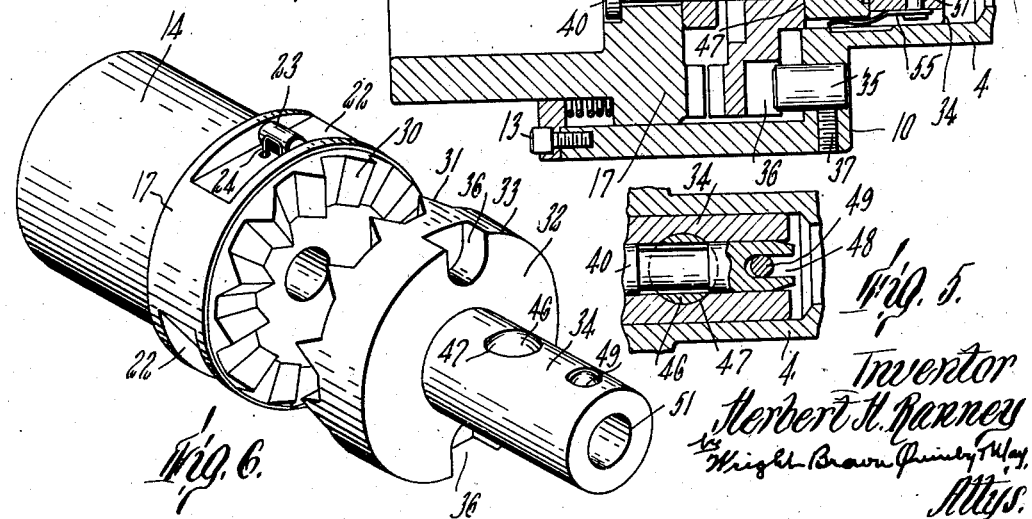
Inventor
Herbert H. Ranney Patented Dec. 9, 1947

2,432,443

UNITED STATES PATENT OFFICE 2,432,443

RELEASING TAP AND DIE HOLDER

Herbert H. Ranney, Windsor, Vt., assignor to Cone Automatic Machine Company Inc., Windsor, Vt., a corporation of Vermont Application October 16, 1945, Serial No. 622,553

2 Claims. (Cl. 10—89)

This invention relates to tap and die holders and has for an object to provide such a holder by which the length or depth of the threads cut may be controlled with great accuracy. To this end provision is made for a positive clutch drive of the holder, and a latch to release the clutch when threading has progressed to the desired extent.

For a complete understanding of this invention reference may be made to the accompanying drawings in which Figure 1 is a fragmentary side elevation of a work spindle and the holder provided with a tap for threading work carried by the work spindle, the holder being in retracted position.

Figure 2 is a fragmentary longitudinal central sectional view through the holder in operative condition.

Figure 3 is a view similar to Figure 2, but showing the parts in released condition.

Figures 4 and 5 are detail sectional views on lines 4—4 and 5—5, respectively, of Figure 2.

Figure 6 is an exploded isometric view of the clutch elements in unclutched relation.

Referring first to Figure 1, at 1 is indicated a work holding spindle supporting work to be threaded. For the purpose of this description it may be assumed that the spindle rotates and that the tap and die carrier does not, though as will later appear, this relationship may be reversed if desired.

At 2 is shown a support for the tool carrier, the tool carrier being illustrated at 3 and provided with a shank portion 4 adapted to be clamped in the support 2 as by a set screw 5.

The carrier 3 as shown best in Figures 2 and 3, embodies a hollow body 10 which may be formed integral with the shank 4 and partly closed off at its forward end, as by means of a ring 11 which may be secured to its outer wall 12 as by a screw 13. The head of this screw 13 may project forwardly of the body and act as a stop, as will later appear. Axially slidable within the body 12 is a threading tool holder 14 having a socket 15 therein to receive the shank of a threading tool, which in Figure 1 is illustrated as a tap 16. The forward portion of the holder 14 is of a diameter to slide through the ring 11 and backwardly thereof it is of larger diameter, as at 17, to slide within the body wall 12. It is normally pressed rearwardly as by a coil spring 20 reacting between the rear face of the ring 11 and an annular shoulder 21 on the holder. The large diameter portion 17 of the holder is provided with a plurality of cut out portions 22, three such portions being shown, and within each of these is seated a clutch roll 23. This clutch roll rides between the inner wall of the cut-out 22 and the inner face of the body wall 12 and each roll is positioned on one side of a wire spring 24, all of the rolls being on the same side of their respective springs with reference to the axis of the holder, but they may be reversed from one to the other side for a purpose which will later appear. These rolls permit the rotation of the holder 14 within the body in one direction, and arranged as shown in Figure 4, this direction is that shown by the arrow, but they prevent rotation of the holder within the body in the reverse direction, immediately wedging between the adjacent walls of the body and holder to prevent such rotation.

The rear face of the holder is provided with annular clutch faces 30, which are adapted to contact mating clutch faces 31 of a clutch element 32. It will be noted that these clutch faces are inclined to the axis of these parts so that any relative rotation thereof acts to wedge them apart, to disengage the clutch faces. The clutch element 32 has an enlarged diameter portion 33 slidably mounted in the body 3 and a small diameter portion 34 slidable within the shank portion 4. It is prevented from rotating in either direction relative to the body as by a pair of plugs 35 extending through the rear wall of the body and extending into marginal slots 36 in the enlarged diameter portion 32 of the clutch element. These plugs 35 may be fixed in position as by set screws 37 threaded through the body wall member 12 and having their inner ends engaging in depressions in the plugs 35.

The holder 14 carries a draw rod 40, this rod having a head 41 resting in a recess 42 at the rear end of the socket 15, and back of the holder the draw rod has pinned thereto a collar 43. The head 41 and the collar 43 prevent axial motion between the draw rod and holder but permit relative angular motion about the axis of these parts. The draw rod 40 has a reduced diameter portion at 44 which forms a shoulder 45, and with this shoulder cooperates a latch member 46 which is seated in a diametrical slot 47 through the smaller diameter portion 34 of the clutch element. The rear end of the draw rod 40 is slotted as at 48 for the passage of a rivet 49 seated in mating holes 50 in the clutch element and at opposite sides of a central bore 51 through which the draw rod passes.

The shank portion 4 has a small diameter internal bore at 52, and adjacent thereto but rearwardly thereof, an enlarged diameter portion 53. When the latch 46 is opposite to the enlarged diameter portion, as shown in Figure 2, its rounded edge 54 engages therein and is so pressed as by a leaf spring 55 which engages its opposite end and is secured by the rivet 49. In this position of the parts an annular shoulder 57 on the latch 46 engages the shoulder 45 of the draw rod and holds the clutch element 32 in clutching relation with the mating clutch face of the holder.

When the tool is in use, the support 2 is moved to present the threading tool 16 to the work until the stop screw 13 engages the fixed stop 60 (see Figure 1) at which time the threading tool is in engagement with the work. Further rotation of the work then draws the threading tool thereon, pulling the holder 14 with it, and moving the draw rod 40 forwardly. This takes place until the latch 46 engages the reduced diameter portion 52 of the body, whereupon the latch is moved to its central position laterally, releasing the draw rod 45 and allowing the clutch elements to open. This releases the holder for rotation with the work, this being the direction in which rotation is permitted by the clutch rolls 23. The threading action thus stops, since the relative rotation between the work and the threading tool stops. This action continues until the work is rotated in the reverse direction, but as the holder cannot rotate in this direction within its body 12, the threaded engagement between the work and the threading tool causes the tool to be unscrewed and to retract. As soon as it retracts sufficiently to be freed from the work, the spring 20 snaps the holder backwardly into clutching engagement with the clutch element and snaps the draw rod 44 and the clutch element rearwardly to reset the mechanism ready for a succeeding threading operation.

By the provision of the rolls 23 which can be changed from one to the other side of their respective springs 24, the mechanism may be adjusted for either right or left hand threading, it being necessary to permit relative rotation in the unthreading direction and to prevent it in the threading direction. It will also be evident that the mechanism will operate in substantially the same way if the tool holder rotates and the work is stationary, the relative motions of the parts being still the same.

From the foregoing description of an embodiment of this invention, it should be evident to those skilled in the art that various modifications and changes might be made without departing from the spirit or scope of this invention.

I claim:

1. A device of the class described, comprising a body, a threading tool holder movable axially of said body and rotatable about said axis in one direction, means for preventing relative rotation between said holder and body in the opposite direction, a clutch portion on said holder, a mating clutch element carried by said body, means holding said clutch element against rotation relative to said body while permitting axial motion of said clutch element, a latch member carried by said clutch element which when in latched condition holds such clutch element and clutch portion in clutching relation, and means effective on relative axial motion to a predetermined extent between said body and clutch element as said holder advances relative to the work during the threading operation while said body is held against such advance to release said latch and permit unclutching of said element and portion and releasing said holder for rotation relative to said body with the work.

2. A device of the class described, comprising a hollow body, a threading tool holder movable axially within said body and rotatable relative to said body about said axis in one direction, said holder having a clutch portion, a mating clutch element carried within said body and movable axially toward and from clutch-closing relation to said clutch portion, the mating clutch faces of such element and portion being inclined in directions to cause relative rotation to separate such faces axially, means holding said clutch element against rotation relative to said body, a draw rod journaled coaxial in said holder and having means to prevent relative axial motions thereof, said draw rod extending into such clutch element and having a shoulder thereon, a latch element carried by said clutch element for lateral motion relative thereto and in one postion engaging said shoulder and holding said element and portion in clutching relation, said body having a portion engaging said latch and permitting said latch to be in shoulder-engaging position and a portion adjacent to said first portion axially positioned to force said latch to move to release said shoulder when said clutch element is moved forwardly by forward motion of said draw rod, a spring engaging said latch and tending to move said latch to shoulder-engaging position, a spring reacting between said body and holder tending to press said holder rearwardly within said body, and means preventing relative rotation between said body and holder in unthreading direction of said holder relative to work being threaded.

HERBERT H. RANNEY.

REFERENCES CITED

The following references are of record in the file of this patent:

UNITED STATES PATENTS

| Number | Name | Date |
|---|---|---|
| 1,346,295 | Burger | July 13, 1920 |
| 2,375,554 | Hook | May 8, 1945 |
| 974,239 | Dalton | Nov. 1, 1910 |